(No Model.) 5 Sheets—Sheet 1.
E. R. KNOWLES.
ELECTRIC ARC LAMP.
No. 459,510. Patented Sept. 15, 1891.
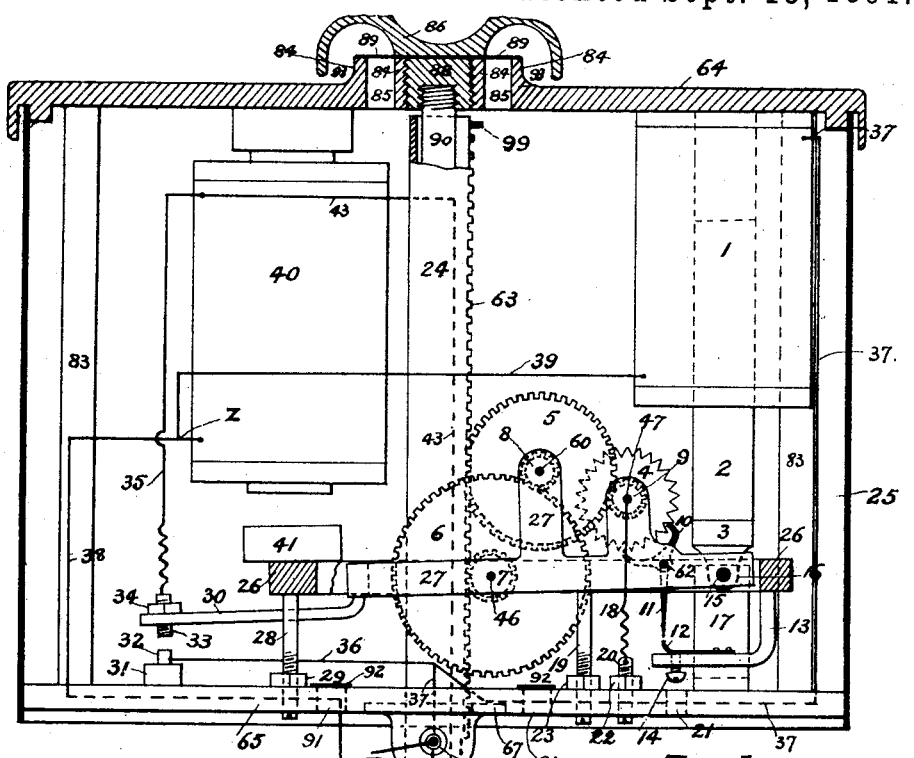
FIG. 1.
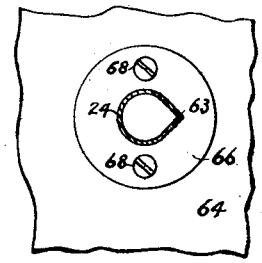
FIG. 8.
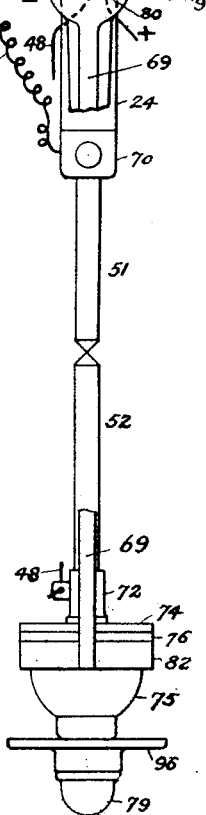
WITNESSES:
E. V. Myers
C. R. Burnell
INVENTOR
Edward R. Knowles
BY
Ernest A. Webb
ATTORNEY.

(No Model.) 5 Sheets—Sheet 2.
E. R. KNOWLES.
ELECTRIC ARC LAMP.
No. 459,510. Patented Sept. 15, 1891.
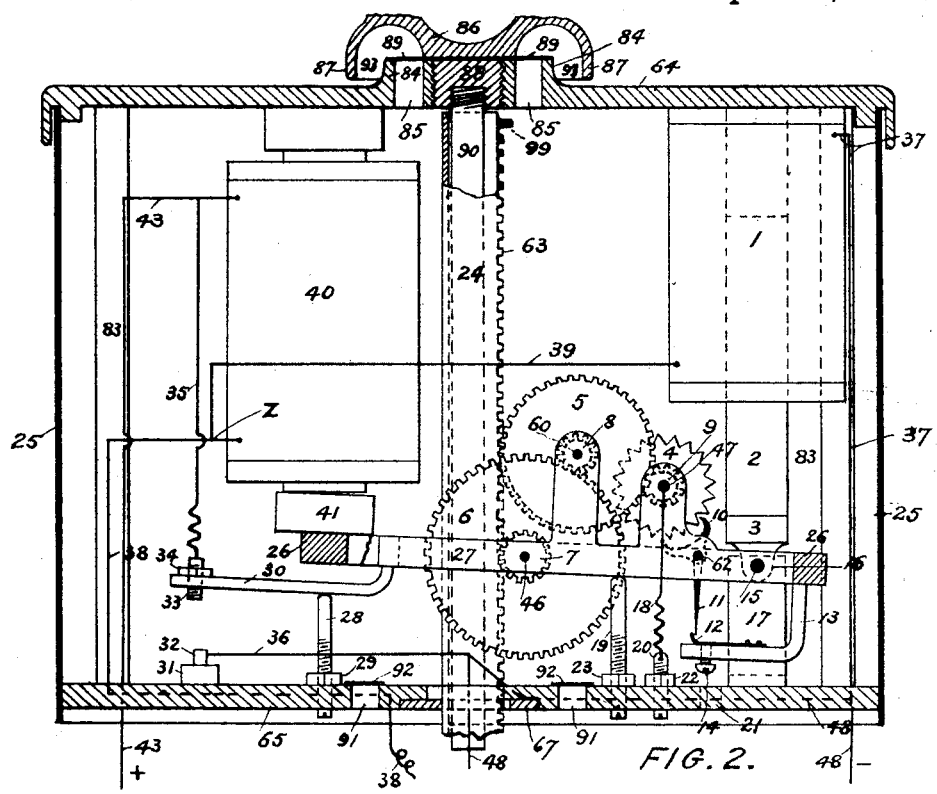
FIG. 2.
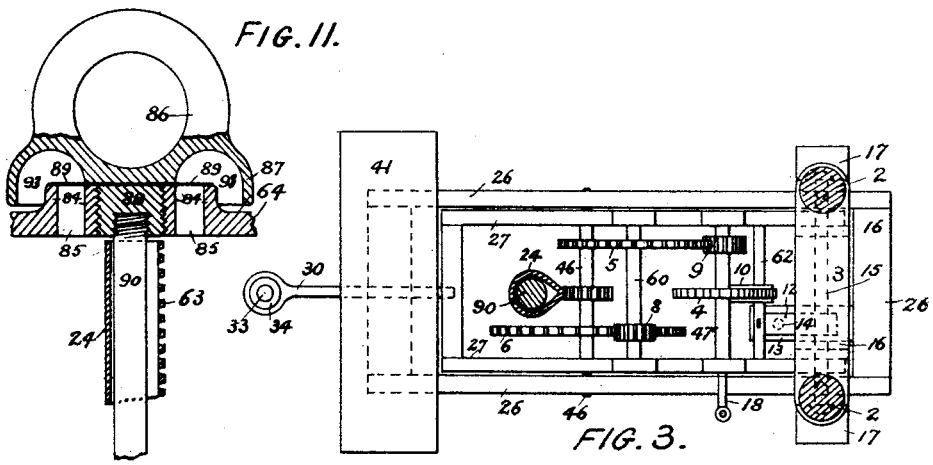
FIG. 11.
FIG. 3.
WITNESSES:
INVENTOR
Edward R. Knowles.
BY
ATTORNEY.

(No Model.) 5 Sheets—Sheet 3.
E. R. KNOWLES.
ELECTRIC ARC LAMP.
No. 459,510. Patented Sept. 15, 1891.
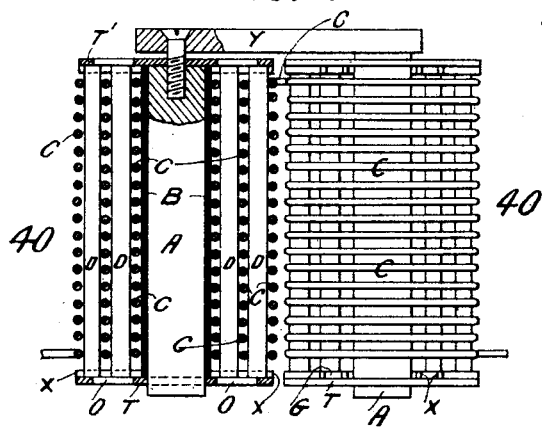
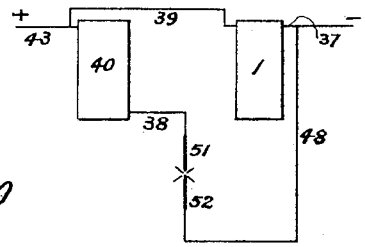
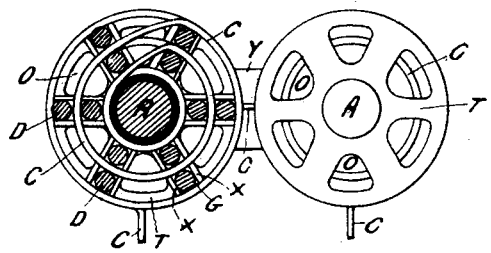
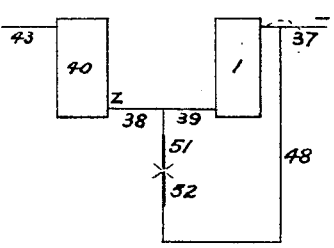
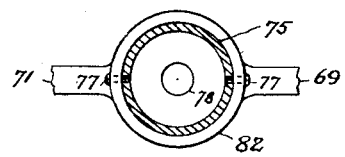
WITNESSES:
INVENTOR
Edward R. Knowles.
BY
ATTORNEY.

(No Model.) 5 Sheets—Sheet 4.

E. R. KNOWLES.
ELECTRIC ARC LAMP.

No. 459,510. Patented Sept. 15, 1891.

WITNESSES:

INVENTOR
Edward R. Knowles.
BY Ernest A. Webb
ATTORNEY.

(No Model.)  E. R. KNOWLES.  5 Sheets—Sheet 5.
ELECTRIC ARC LAMP.

No. 459,510.  Patented Sept. 15, 1891.

WITNESSES:

INVENTOR
Edward R. Knowles
BY
Ernest W. Cobb
ATTORNEY.

UNITED STATES PATENT OFFICE.

EDWARD R. KNOWLES, OF BROOKLYN, NEW YORK.

ELECTRIC-ARC LAMP.

SPECIFICATION forming part of Letters Patent No. 459,510, dated September 15, 1891.

Application filed May 25, 1891. Serial No. 394,086. (No model.)

*To all whom it may concern:*

Be it known that I, EDWARD R. KNOWLES, a citizen of the United States, and a resident of Brooklyn, in the county of Kings and State of New York, have invented certain new and useful Improvements in Electric Lamps, of which the following is a specification.

My invention relates to improvements in electric-arc lamps of the class which are universal in their application—that is to say, lamps which are practically and efficiently operative on either an arc, an incandescent, or alternating-current circuit, as commonly known, or, in other words, what is electrically known as direct and alternating current circuits.

I seek by my invention to produce a lamp complete in all its parts, of simple, durable, and economical construction, and in which the feed and adjustment of the carbon is substantially uniform under all conditions of use, so as to insure a steady and reliable light.

To this end my invention consists of certain improvements in the mechanical construction of the lamp, the arrangement of its various parts to coact with each other, and in the circuit connections and the application of the current to effect the mechanical operations.
My invention also includes various details of construction and arrangement, which, together with the general construction of the lamp and its machinery, will be readily understood from the following description, and the points of novelty constituting my improvements will be designated in the claims concluding this specification.

Figure 9:
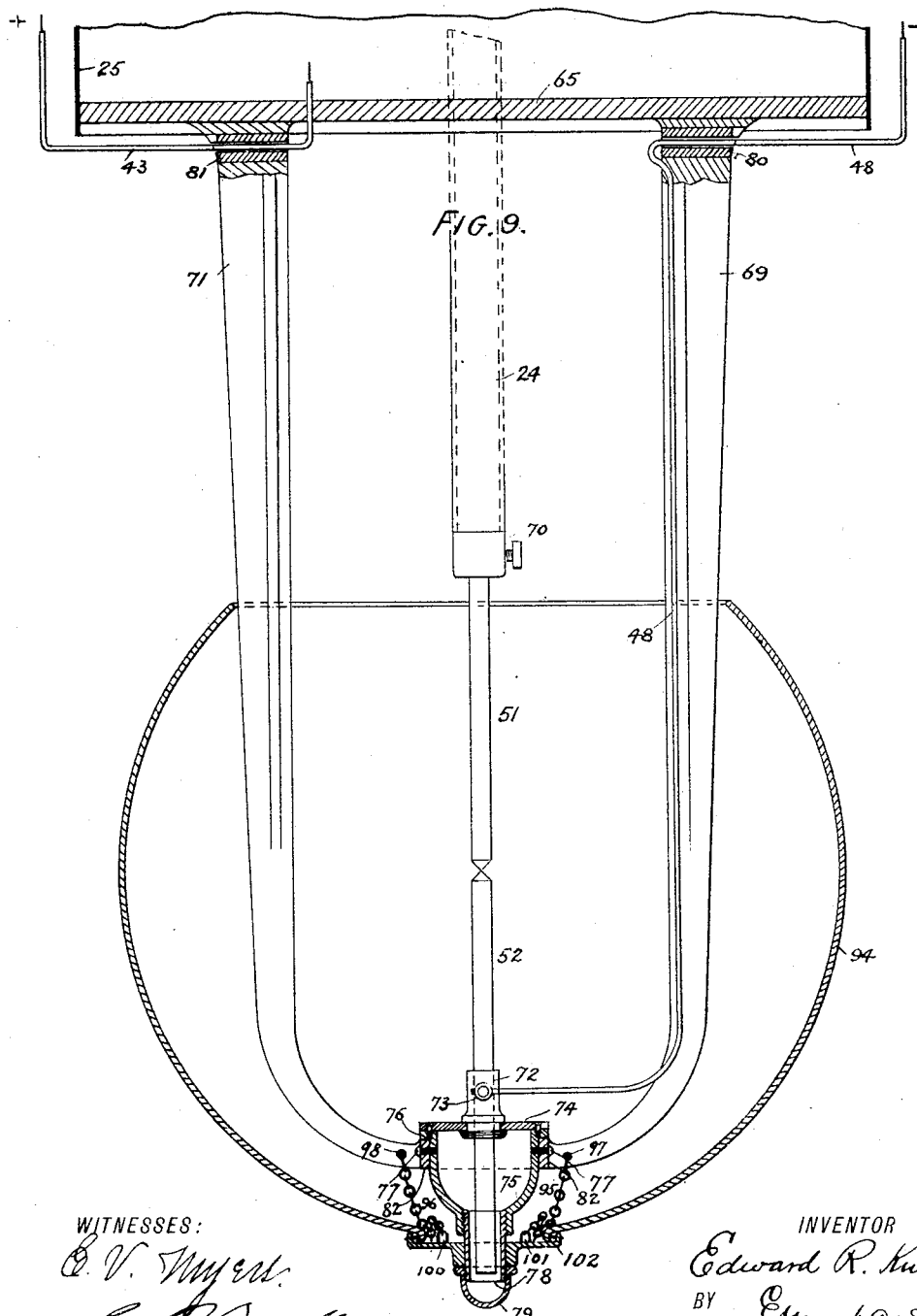
Figure 12:
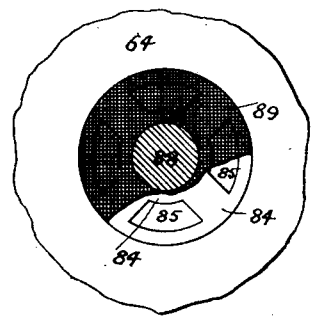
Figure 13:
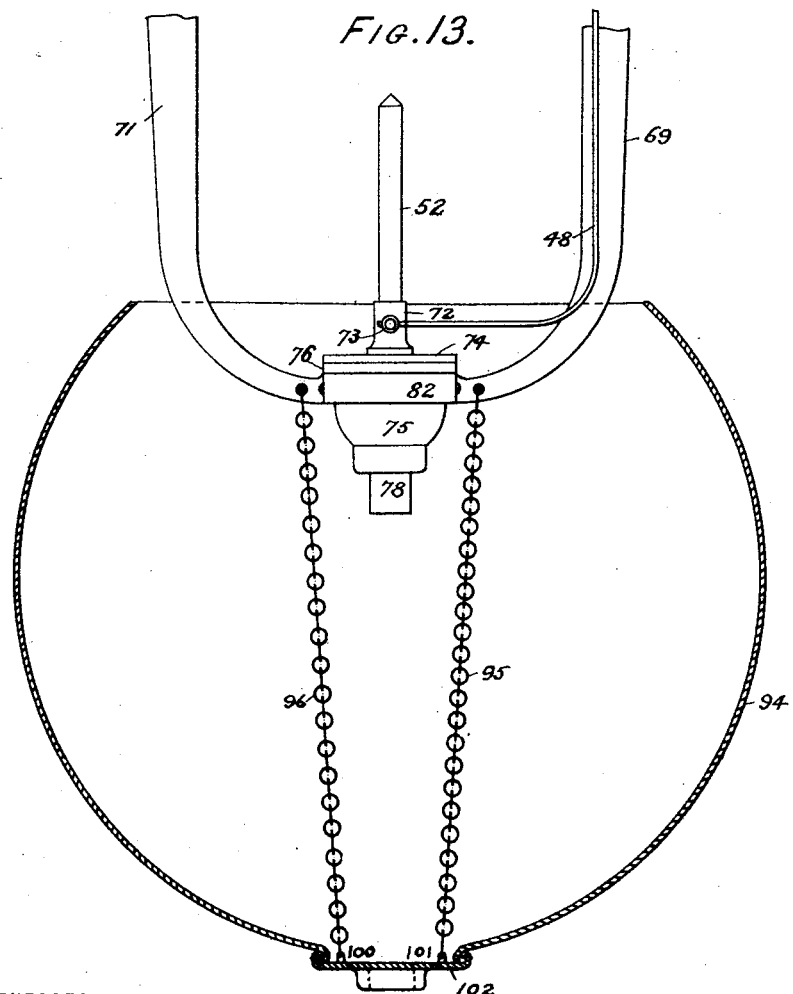

In the accompanying drawings, forming part of this application, in the several figures of which like parts are similarly designated, Figure 1 is a side view in elevation of the lamp mechanism when out of action, the lamp case and frame being partly in section and partly broken away. Fig. 2 is a similar view illustrating the mechanism when in action. Fig. 3 is a plan view of the feed mechanism. Fig. 4 is a diagrammatic view of the ordinary way of making the lamp connections. Fig. 5 is a similar view of my method of making the lamp connections. Figs. 6 and 7 are views in detail of the form of electro-magnet which I prefer to use. Fig. 8 is a cross-section of the upper-carbon rod or rack-bar. Fig. 9 is a side view, partly in section, of the lamp-frame and a central vertical section of the base of the lamp and globe-holder and supporting mechanism. Fig. 10 is a plan view of the base of the lamp. Fig. 11 is a sectional view of the suspending ring, and Fig. 12 is a plan view of the ventilating top of the lamp-case. Fig. 13 is a side view, partly in section, of the globe-holder and supporting mechanism, showing the globe removed from the lamp-frame.

The frame of the lamp is composed of a top plate 64, supported from a base-plate 65 by rods 83, and the whole is inclosed by a shell 25, these parts together forming what I shall designate as the "case" of the lamp. Attached to the base-plate 65 are the side rods 69 and 71, (see Fig. 9,) which are united together at their lower ends to form an opening 85, which is substantially ring-shaped, (see Figs. 9 and 10,) within which the base proper of the lamp carrying the lower-carbon holder 72 is supported.

Within the lamp-case, above described, is contained the operating parts of the lamp, which I will now proceed to describe.

40 is an electro-magnet, Figs. 1 and 2, of low resistance and connected in series with the main-circuit wires 43 and 48 and the carbons 51 and 52, the complete circuit being +, wire 43, magnet 40, wire 38, carbons 51 52, wire 48, and —. The magnet 40 is preferably of special form of construction, which will be hereinafter fully described.

1 is a solenoid electro-magnet of high resistance, and is connected between a point Z, which is the inner terminal of the low-resistance magnet 40 and the negative terminal of the lamp, the circuit being point Z, wire 39, magnet 1, wire 37, and wire 48 to the negative terminal.

41 is the armature of magnet 40, and is attached to one end of a frame 26, which is pivoted at its other end at 15 to a support 17. The position of the armature 41 is regulated by raising or lowering the stop 28 and locking it in position by the set-nut 29. Inside of frame 26 is placed another frame 27, which is pivoted at 46 in frame 26 and has attached to its other end the movable core 2 of magnet 1. The position of frame 27 is regulated by raising or lowering stop 19 and locking it in position by the set-nut 23. The pivot on which 27 is free to move is the axle 46 of the pinion 7, which passes through frame 27 and is journaled in frame 26, Fig. 2. Upon axle 46 is also placed a gear-wheel 6, which meshes with a pinion 8, whose axle 60 is pivoted in frame 27. Axle 60 carries a gear-wheel 5, meshing with a pinion 9, whose axle 47 is journaled in frame 27, and this axle also carries an escapement-wheel 4, which is controlled by the escapement 10, whose axle is journaled in frame 27. By this arrangement it will be seen that any movement of armature 41 will move with it frames 26 and 27 and all the train of gear-wheels and pinions already described, and that any movement of magnet-core 2 will move with it only frame 27, pinion 8, gear 5, pinion 9, escapement-wheel 4, and escapement 10, the axle of pinion 7 and gear 6 being fixed in frame 26 and frame 27 and its train of gears and pinions revolving around it as a pivot or center.

24 is a metal tube, which will be hereinafter more fully described, provided with teeth 63, which mesh with pinion 7. This tube 24 is maintained in a vertical position and directed by a rod 90, attached to the top plate 64 of the lamp-case, and which fits the interior of tube 24, and over which it is free to slide, as will be hereinafter more fully described, and passes through the guide-plate 67 in bottom plate 65, and carries at its lower end the carbon-holder 76, which in turn carries the upper carbon 51. The lower carbon 52 is carried by the lower-carbon holder 72 and is in electrical connection with wire 48, as shown.

18 is a spring attached at one end to frame 27 and at the other end to the tension-regulator 26 22, by means of which it can be made to give a stronger or weaker pull, as may be desired. This spring acts to keep frame 27 in contact with stop 19 unless it is lifted by the action of magnet 1 upon its core 2.

On the end of frame 26 is fastened the bent arm 13, provided on its upper side with a detent-spring 12, which may be adjusted by means of screw 14 through an opening 21 in the frame of the lamp. The escapement 10 is provided with a downwardly-projecting lever 11, whose outer extremity is vertically over the detent-spring 12. When the lamp is out of action, the position of the parts is as shown in Fig. 1, frame 27 being supported by stop 19 at such a height that lever 11 clears detent 12 and is free to vibrate with escapement 10; but when the lamp is in action, as shown in Fig. 2, the raising of frame 26 permits lever 11 to come in contact with detent 12, and lever 11 is thereby locked and prevented from vibrating unless frame 27 is lifted by magnet-core 2, in which case it is free and allowed to vibrate.

When a current of electricity is passed through the lamp, magnet 40 is energized and attracts its armature 41, thereby lifting frame 26 and with it frame 27, and all the train of gears and pinions, at the same time allowing arm 11 to come into contact with detent 12, thereby locking the escapement and preventing the train of gearing from revolving. When frame 26 is lifted, it carries with it rod 24, which has its gear 63 in mesh with pinion 7, thereby separating the carbons 51 and 52 and starting the electric arc. As the carbons burn away and the arc increases in length its resistance increases, and more and more current is shunted through magnet 1 until it is energized sufficiently to draw up its core 2, thereby lifting frame 27 and the train of gearing and lifting arm 11 until it is released from detent 12, thereby permitting the escapement 10 to vibrate the train of gearing to move and the rod 24 to descend until the distance between the carbons is normal, whereupon core 2 descends and arm 11 is again locked by detent 12. This operation is repeated so long as the lamp is in action. When the current is cut off or ceases to pass through the lamp, the parts again resume the position which they had at first. This lamp is of the non-differential type, there being in it but one variable element, the shunt-magnet 1, as shown in Fig. 1. The main magnet 40 does not vary in its action nor exert any opposing influence to shunt-magnet 1, its sole function being to attract armature 41 and retain it in a fixed position during the operation of the lamp.

Attached to frame 27 is the arm 36, carrying an insulated contact-point 33, which is adjustable by means of the nut 34. Immediately below contact-point 33 and upon the frame of the lamp and insulated therefrom by insulation 31 is a contact-point 32, which is connected to the other terminal of the lamp by wire 32. While the lamp is burning in its normal condition these points are out of contact; but should the mechanism stick or the carbon refuse to feed as the arc grows longer and longer core 2 will be drawn farther and farther up into magnet 1 until the contact-points 32 and 33 come together, when the lamp will be short-circuited, the current then passing through wire 43, wire 38, contacts 32 and 33, wire 36, and wire 48, thus cutting the lamp mechanism out of circuit and preventing any possible break in the continuity of the circuit.

The method of making the connection of my lamp of which I make use is shown diagrammatically in Fig. 5, the method usually employed being shown in Fig. 4. The usual method is to connect the low-resistance magnet (see Fig. 4) in direct series with the terminals of the lamp and the carbons 51 and 52, the circuit being +43 40 38 51 52 48 37 −, the high-resistance magnet 1 being connected around the arc and from terminal to terminal of the lamp, the circuit being +43 39 1 37 −. I have discovered that if the high-resistance magnet be connected, not as shown in Fig. 4, but as shown in Fig. 5, from a point Z, which is the inner terminal of the low-resistance magnet 46, to the negative terminal of the lamp, so that it is in series with the main magnet and the terminals of the lamp, a much more regular and steadier action of magnet 1 is obtained, the complete circuit being +43 40 Z (which is the inner terminal of magnet 40) 38 39 1 37 and —.

The side rods 69 and 71 near the point where they join the base-plate 65 of the lamp-case are enlarged, as shown in Figs. 1 and 9, and are provided with openings, into which are inserted tubular bushings 80 and 81 of any suitable insulating material, and through these bushings the lead-wires 43 and 48 are passed, 43 being carried through base-plate 65 to the magnet 40, and the other 48, being carried down along side rods 69 to the lower-carbon holder 72. By these means the lead-wires 43 and 48 are protected and all binding-posts upon the case or frame of the lamp are dispensed with, no openings through the top or sides of the lamp-case being required for the lead-wires, and the lamp is thus rendered water-proof, requiring no protecting hood or cover to shelter it, as is usually the case with lamps of this class.

The base of the lamp is preferably arranged as follows: In Figs. 9 and 10 the side rods 69 and 71 are connected at their lower ends to form an annulus or ring-shaped opening 82. This ring is bored out true on its inner surface and has inserted in it a tubular piece 75 of substantially cup-shaped form, and provided at its upper end with a side flange 76, which projects over and rests upon the upper edge of the ring-shaped opening 82 and is detachably held in place in said opening by means of set-screws 77, which can be inserted and removed at pleasure. To the bottom of the cup-shaped piece is a tube 78, which may be suitably attached thereto or formed in one piece therewith, and which serves to cover and protect the lower carbon 52 and to carry the globe-holder 102, its outer end being closed by a cap 79, which also serves to hold the globe-holder 102 in its working position. Resting upon and fastened to the flange 76 I arrange a disk 74 of any suitable insulating material, and to this disk and at about its center the lower-carbon holder 72 is properly secured. One advantage of this arrangement is that the lower-carbon holder 72 and the tubular inclosing case 75 78 for the lower carbon are all united together and can all be taken, while so united, out of the lamp-frame, if so desired, thus obviating the necessity of taking the various pieces apart. Another advantage is that these parts can be readily assembled together and adjusted before they are put in place in the lamp-frame.

The lamp-frame, consisting of the base-plate 65, side rods 69 and 71, and ring-shaped bottom 82, may, if desired, be cast in one piece, thus cheapening and simplifying the construction of the frame and rendering it easier to make the various parts true and square. I have also improved the construction of the upper-carbon rod 24, which, as shown in Figs. 1 and 8, is made in the form of a tube whose cross-section is partly round and partly square, and preferably three-quarters round and one-quarter square, with the rack-teeth 63 cut on the square edge, as shown. By this construction a gear-rod (or, as commonly called, a "rack-bar") is obtained which can be cheaply made from sheet metal or drawn as a tube, and which cannot slip or turn in the holes through which it passes like a round rod. Moreover, when a rod of this form is employed the holes through which it is to pass can be made and adjusted to conform to the shape of and accurately fit the rod, and this can be accomplished by boring the holes with a drill and fitting them to the rod by reaming them to size with a reamer and then cutting out the portion for the square edge of the rod. This cannot be done with a square or rectangular rod, such as is frequently employed.

I will now proceed to describe the construction of main magnet which I prefer to use in connection with my improved form of lamp. It consists, as particularly shown in Figs. 6 and 7, of an iron core A, which may be laminated or made of a bundle of wires or solid, as may be desired, and to which is suitably fastened at either end the metal heads T T'. These heads are of skeleton form, consisting of an outer rim $T^2$, a central hub $T^3$, and a series of radial arms extending from the hub to the rim. Between the arms openings O O are provided, and the under side or inner faces of the arms are scored to form a series of radial grooves G. The core A is covered with insulation and wound with a layer of any suitable wire, each layer or convolution of wire being separated from adjacent layers or convolutions by a space, as shown. Next there is placed in the grooves G rods or strips D of any suitable insulating material, and the wire C is continued in a layer upon the outer surfaces of these rods and so on until as many layers of wire C with insulating-rods D between them are wound around the core A as may be desired. The wire C may be covered with insulation or may be bare and of any material desired—such, for instance, as copper, iron, or German silver. By this arrangement an electro-magnet is obtained which is perfectly insulated, is open and ventilated, and which permits of the use of a much smaller wire for a given current than is ordinarily used, as the heat generated is rapidly diffused and dissipated. Such an arrangement also admits of the magnet being made of any desired resistance by winding it with iron or German-silver wire, and this winding also permits of the use of bare wire, as none of the layers or convolutions touch one another.

When magnets of the construction above described are used in lamps of this description, more or less heat is generated, and if they are tightly inclosed in a receptacle or box, such as shown, the heat generated will be conserved and all the other mechanism in the box will be more or less heated. To obviate this difficulty I arrange the case of my lamp in such a manner that it will be ventilated and so that a current of air can at all times pass through it, thus carrying away the heat and cooling the mechanism, and yet at the same time the box or case shall be water and dust tight. I prefer to do this in the following manner: The top plate 64 is continued up at its center in a circular boss 84, (see Figs. 11 and 12,) which is perforated by a series of openings 85, and also by a screw-threaded central opening, into which is tightly screwed or fastened the screw-threaded stem 88, forming part of the suspending-ring 86. The lower portion of this ring is cup-shaped, having on its under side a groove 93, so that when the ring 86, with stem or projecting screw 88, is screwed into place it shall form a cover to the boss 84 and the openings 85, thereby forming curved openings 85 93 from the exterior to the interior of the lamp-case 25. Between the part 86 and the screw-threaded boss 84 is inserted a disk of fine wire-gauze 89, which covers the openings 85 and prevents the ingress of dust and at the same time allows the free egress of heat and air from the interior of the lamp-case. The suspending-ring 86, together with the cup-shaped flange 87 and stem 88, is preferably all cast in one piece. In the base-plate 65 of the lamp-case are formed openings 91, also covered by fine wire-gauze 92. By this arrangement the heat generated by the electro-magnet 40 is carried off by the current of air passing in at the openings 91 in the base-plate 65 and out at the openings 85 93 in the top plate 64 of the lamp-case 25, while all ingress of dust is prevented by the wire-gauze 89, which covers the openings 85 and 91.

In order to reduce the length of the lamp and to make it as compact as possible, I dispense with the projecting tube or horn usually employed in lamps of this description and projecting from the top of the lamp-box, and from which the lamp is ordinarily suspended, and I also dispense with the tube projecting from the base of the lamp and which is usually employed to carry the globe-holder. I will now describe the way in which I prefer to accomplish these results. In order to dispense with the upper tube or horn it is necessary to make the upper-carbon rod of such a length that its upper end never passes above the top plate of the lamp-case. To provide a bearing for the upper-carbon rod, I fasten in any suitable manner to the center of the stem 88 of the suspending-ring 86 a rod 90, which is of such a diameter that it just makes a sliding fit inside the tube 24, of which the upper-carbon rod is made. This rod extends down and through the opening in the guide-plate 67, fixed in the base-plate 65 of the lamp-case. The upper-carbon rod or tube 24 passes over this rod, which serves as a long bearing for it to slide upon. By this arrangement the upper-carbon rod needs no bearing in the top plate 64 and can slide down as the carbon 51 is consumed until its upper end reaches the pinion 7, beyond which no further sliding action can take place, its further downward motion being limited by the stop 99, which comes in contact with pinion 7. By this arrangement a bearing for the carbon-rod 24 in the top plate 64 is dispensed with, and as the rod 24 never passes above the lower surface of top plate 64 no projecting tube is needed above the top plate 64 as a cover or protection for the rod 24, and it can thus be dispensed with and the top of the lamp shortened by this much.

To shorten the bottom of the lamp and dispense with the tube usually projecting below the base, which serves as a support for the globe-holder, I prefer to arrange the globe-holding mechanism in the following manner: The projecting tube 78, forming part of the tubular base-piece 75, is made just long enough to allow the globe-holder 102 to be placed upon it and held in place by the screw-cap 79. The globe-holder 102 supports the globe 94, which incloses and passes up around the side rods 69 and 71 and base 82 of the lamp-frame. Attached to the side rods 69 and 71 at any convenient points, as 97 and 98, are two chains 95 and 96, which are attached at their other ends at the points 100 and 101 to the globe-holder 102. When the globe-holder 102 is placed in position on the tube 78, the chains 95 and 96 coil up and lie in the globe-holder 102. (See Fig. 9.) When it is desired to insert new carbons in the lamp or to get at the lower-carbon holder 72 for any purpose, the cap 79 is removed, and the globe-holder 102, and with it the globe 94, is slid down and off the tube 78 and is allowed to hang suspended by the chains 95 and 96, as shown in Fig. 13, the chains being made of such a length that the top of the globe 94 never quite clears the bottom 82 of the lamp-frame, and the globe hangs suspended in a vertical position, as shown. By this means any long projecting tube below the bottom of the lamp is dispensed with and the total lamp length shortened by this amount, and at the same time a safe means for removing and holding the globe 94 is provided.

What I claim as my invention, and desire to secure by Letters Patent, is—

1. In an electric lamp having a low-resistance magnet arranged in the main circuit and a high-resistance magnet arranged in a derived circuit, the combination of an inner frame carrying the carbon-feeding mechanism and adapted to be actuated by the high-resistance magnet to operate said mechanism, and an outer frame pivotally connected to said inner frame and adapted to be actuated by the low-resistance magnet to stop the motion of said mechanism, whereby the feeding mechanism will be automatically set in operation as the current increases in strength in the high-resistance magnet and automatically stopped when these conditions are reversed, substantially as described.

2. In an electric lamp, a frame movable to establish the arc, a main magnet, an armature therefor by which the movement of the arc-establishing frame is controlled, a clock-work mechanism, a supporting-frame therefor pivoted in and carried by the arc-establishing frame, a magnet in the shunt for controlling the movement of the clock-work frame, a detent carried by the arc-establishing frame for the purpose of controlling the escapement of the clock-work mechanism, and a vertical-moving rod or holder engaging the clock-work mechanism and supported in the frame of the lamp.

3. In an electric lamp, a frame movable to establish the arc, a main magnet, an armature therefor by which the movement of the arc-establishing frame is controlled, a clock-work mechanism, a supporting-frame therefor pivoted in and carried by the arc-establishing frame, a magnet in the shunt for controlling the movement of the clock-work frame, a detent carried by the arc-establishing frame for the purpose of controlling the escapement of the clock-work mechanism, and a vertical-moving rod or holder engaging the clock-work mechanism and supported in the frame of the lamp, substantially as described.

4. In an electric lamp of substantially the construction described, a removable base upon which the lower-carbon holder is supported, comprising a flanged tube the flange of which rests upon the ring-shaped bottom of the lamp-frame, an insulated plate secured to the flange of the tube, and means, such as screws, for removably uniting said base to the ring-shaped bottom, substantially as described.

5. In an electric lamp of substantially the construction described and having a ring-shaped or tubular opening in the bottom of the lamp-frame, the combination of a removable base comprising a flanged tube removably secured in said tubular opening and extending below the same, and a plate of insulating material attached to the flange of said tube and supporting the lower-carbon holder, substantially as described.

6. In an electric lamp of substantially the construction described, an upper-carbon rod composed of a tube of sheet or wrought metal whose cross-section comprises a circular segment, and two straight sides constituting an angular edge and having rack-teeth cut in the angular edge, substantially as described.

7. In an electric lamp, a frame movable to establish the arc, a main magnet, an armature therefor by which the movement of the arc-establishing frame is controlled, a clock-work mechanism, a supporting-frame therefor pivoted in and carried by the arc-establishing frame, a magnet in the shunt for controlling the movement of the clock-work frame, a detent carried by the arc-establishing frame for the purpose of controlling the escapement of the clock-work mechanism, and a vertically-moving rod or holder composed of a tube partly round and partly square in cross-section and having rack-teeth cut in the square edge to engage the clock-work mechanism and supported in the frame of the lamp, substantially as described.

8. In an electric lamp, a frame movable to establish the arc, a main magnet connected in series with the terminals of the lamp and the carbons, an armature therefor by which the movement of the arc-establishing frame is controlled, a clock-work mechanism, a supporting-frame therefor pivoted in and carried by the arc-establishing frame, a shunt-magnet for controlling the movement of the clock-work frame connected to the inner terminal of the main magnet and in series with the main magnet and the terminals of the lamp, a detent carried by the arc-establishing frame for the purpose of controlling the escapement of the clock-work mechanism, and a vertically-moving rod or holder engaging the clock-work mechanism and supported in the frame of the lamp, substantially as described.

9. In an electric lamp of substantially the construction described, an inclosing case for the lamp mechanism, the bottom plate of which is provided with ventilating-openings 91, protected by dust and water excluding devices 92, and the top plate of which is provided with a central boss having a central screw-threaded opening to receive the stem of the lamp suspending ring, and ventilating-openings 85 arranged around said central opening, said ventilating-openings being protected by the dust and water excluding device 89, substantially as described.

10. The combination, with the ventilating-openings of the inclosing case for the mechanism of an electric lamp, of means for preventing the entrance of dirt or water into the inclosing case, said means comprising a combined suspending-ring and protecting-cover consisting of a stem screw-threaded to engage a screw-threaded opening in the case, a cup-shaped flange above the stem, and a ring above the flange, as set forth.

11. A suspending-ring and protecting-cover for the ventilated inclosing case of an electric lamp of substantially the construction shown, provided with a central screw-threaded stem below the cup-shaped flange adapted to screw into the top of the lamp-case, substantially as described.

12. In an electric lamp having an inclosing case of substantially the construction described, the combination, with the tubular carbon-rod 24, of a bearing-rod 90, suitably held in a vertical position and upon which the carbon-rod slides, as set forth.

13. In an electric lamp having an inclosing case of substantially the construction described, the combination, with the tubular carbon-rod 24, of a bearing-rod 90, upon which the carbon-rod slides, said bearing-rod being secured at the top of the inclosing case to the stem 88 of the protecting-cover, as set forth.

14. In an electric lamp, an adjustable globe-holder comprising the globe-holding plate 102, surrounding the extension-tube of the lamp-bottom and held in place thereon by a removable cap 79, in combination with suspending-chains 95 and 96, extending from the side rods 69 and 71 to the plate 102 and adapted to be distended and coiled as the position of the globe-holding plate varies, as set forth.

Signed at New York, in the county of New York and State of New York, this 26th day of March, A. D. 1891.

EDWARD R. KNOWLES.

Witnesses:
 E. V. MYERS,
 C. R. SEWELL.